Aug. 9, 1966 R. E. POTTER 3,264,722
MAIN BEARING SEAL REMOVER
Filed June 26, 1964
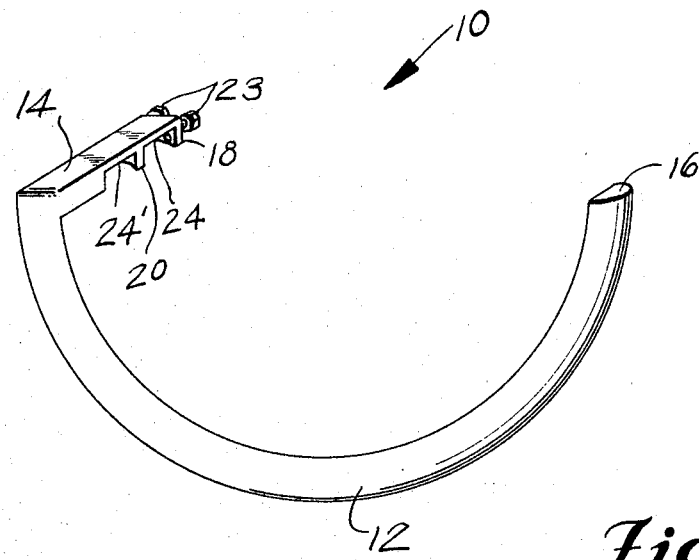
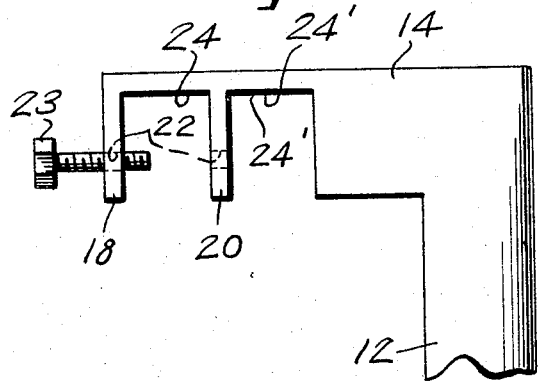
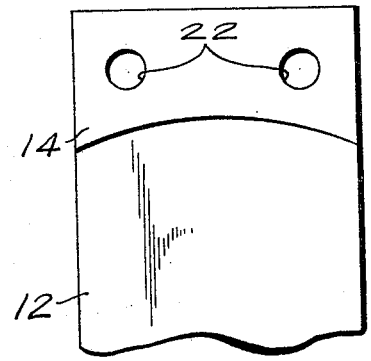

United States Patent Office 3,264,722
Patented August 9, 1966

3,264,722
MAIN BEARING SEAL REMOVER
Robert E. Potter, 2931 Lincoln Garden,
Crown Point, Ind.
Filed June 26, 1964, Ser. No. 378,143
6 Claims. (Cl. 29—235)

This invention relates to tools, and more particularly to a main bearing seal removing tool.

It is an object of the present invention to provide a bearing seal remover which will be used to remove main bearing seals on internal combustion engines.

Another object of the present invention is to provide a bearing seal remover which will have a pair of slots on the arm member, each to be used for different size engines.

A further object of the present invention is to provide a main bearing seal remover which will save a maximum of time and will require a minimum of effort in removing main bearing seals from engines.

A still further object of the present invention is to provide a bearing seal remover which will be used to put a new bearing seal onto the engine with the aid of a heavy length of string.

Other objects of the invention are to provide a bearing seal remover bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a perspective view of the seal remover comprising the present invention;

FIGURE 2 is a fragmentary end view of FIGURE 1; and

FIGURE 3 is an end view of FIGURE 2.

Referring now more in detail to the drawing, a bearing seal remover 10 made in accordance with the present invention is shown to include an arcuate body 12 made of steel having an offset arm 14 which provides a means for bolting bearing seal remover 10 onto the seal guide. The arcuate body 12 and the end 16 of seal remover 10 is of semicircular cross sectional configuration. A pair of parallel lips 18 and 20 of offset arm 14 having a roughened surface in order to secure bearing seal remover 10 are used to overcome the lack of sufficient room on the seal guide. A pair of threaded openings through lips 18 and 20 provide a means for threadingly receiving threaded bolts 23 which secure body 12 to the seal guide. Lips 18 and 20 define a pair of slots 24 and 24' which allow the use of seal remover 10 on different engines.

In use, the crankshaft of the engine is loosened and allowed to drop slightly, and the bearing seal remover 10 is placed so that one of the slots 24 or 24' receives the seal guide, and the bolts 23 are then tightened to secure bearing seal remover 10 to the seal guide. The mechanic places a screw driver in the teeth of the flywheel of the engine and rotates the engine, and in doing so, bearing seal remover 10 will push the old seal out.

It shall be recognized that bearing seal remover 10 may also be used to put new seals in an engine by placing a heavy length of string on the seal. The seal is then pushed up over the crankshaft, and the mechanic by using the screwdriver once again rotates the engine while holding onto the end of the string, and keeping a steady pull upon it while rotating the engine, and thus the new seal will enter into place.

While various changes may be made in the detail construction, it shall be understood that such changes shall be within the spirit and scope of the present invention as defined by the appended claims.

What I claim as new and desire to protect by Letters Patent of the United States is:

1. A main bearing seal remover comprising, in combination, an arcuate body member of semicircular cross sectional configuration, an offset arm carried by said arcuate body of said seal remover providing a means for receiving a seal guide, a plurality of bolts carried by said seal remover providing a means for clamping the seal remover to said seal guide.

2. The combination according to claim 1 wherein said offset arm of said arcuate body of said remover is offset at right angles and is rectangular in configuration to receive said bearing seal guide.

3. The combination according to claim 2 wherein a pair of parallel and rectangular lips of said offset arm are used to define a pair of slots, each of said slots comprising a means for receiving different size seal guides of various make engines.

4. The combination according to claim 3 wherein the underside of said lips are arcuate in configuration and the interiors of said slots defined by said lips of said offset arm are roughened to prevent slipping of said tool when in use.

5. The combination according to claim 4 wherein a pair of spaced apart openings through each of said lips defining said slots of said offset arm of said tool are threaded to receive a pair of threaded bolts, said bolts providing a means for securing said bearing seal remover tool to said seal guide, and when said engine is rotated with said bearing seal remover tool in place, said seal removing tool will urge by pushing the old seal out.

6. The combination according to claim 5 wherein said bearing seal removing tool comprises a bearing seal installation tool by tying a length of heavy string onto said seal and then pushing said seal up over the crankshaft of said engine by rotating said engine and holding tension upon the end of said string said new seal is installed in position.

References Cited by the Examiner
UNITED STATES PATENTS 3,029,503   4/1962   Meyer _____ 29—283
3,084,423   4/1963   Fullerton _____ 29—235

WILLIAM FELDMAN, Primary Examiner.

J. C. PETERS, Assistant Examiner.